United States Patent
Shuck et al.

(10) Patent No.: US 10,370,233 B2
(45) Date of Patent: Aug. 6, 2019

(54) DIRECTED ENERGY DEPOSITION SPRAY NOZZLE DISTRIBUTION PATTERN TESTING

(71) Applicant: Rolls-Royce Corporation, Indianapolis, IN (US)

(72) Inventors: Quinlan Yee Shuck, Indianapolis, IN (US); Pavlo Earle, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 232 days.

(21) Appl. No.: 15/418,209

(22) Filed: Jan. 27, 2017

(65) Prior Publication Data

US 2018/0215601 A1   Aug. 2, 2018

(51) Int. Cl.
  *B67C 3/20* (2006.01)
  *B33Y 10/00* (2015.01)
  *B33Y 40/00* (2015.01)
  *G01M 99/00* (2011.01)
  *B05B 7/14* (2006.01)

(52) U.S. Cl.
  CPC .............. *B67C 3/202* (2013.01); *B33Y 10/00* (2014.12); *B33Y 40/00* (2014.12); *G01M 99/008* (2013.01); *B05B 7/14* (2013.01)

(58) Field of Classification Search
  CPC . G01F 1/76; G01F 1/704; G01F 13/00; G01F 25/00
  USPC ........................................... 73/865.9; 141/83
  See application file for complete search history.

(56) References Cited

U.S. PATENT DOCUMENTS

| | | | |
|---|---|---|---|
| 2,483,637 A | | 10/1949 | Hawthorne et al. |
| 3,459,049 A | * | 8/1969 | Kamps .................. F02M 65/00 211/74 |
| 3,998,097 A | | 12/1976 | Akashi et al. |

(Continued)

FOREIGN PATENT DOCUMENTS

| CN | 102564790 A | 7/2012 |
|---|---|---|
| DE | 19836961 A1 | 2/2000 |

(Continued)

OTHER PUBLICATIONS

Extended Search Report from counterpart European Application No. 18152106.3, dated May 30, 2018, 23 pp.

(Continued)

*Primary Examiner* — Timothy L Maust
(74) *Attorney, Agent, or Firm* — Shumaker & Sieffert, P.A.

(57) ABSTRACT

An example spray nozzle distribution pattern testing system may include coaxial collection tubes extending substantially parallel to a major axis, where each coaxial collection tube includes a first end defining an orifice, where the first end is disposed at a first position on a plane substantially orthogonal to the major axis, a second end coupled to an end of a respective outlet tube, and a collection tube wall extending from the first end to the second end, where the collection tube wall at the first end includes a first diameter, where the collection tube wall at a second position between the first end and the second end includes a second diameter greater than the first diameter, where the collection tube wall extending from the second position to the first position tapers toward the major axis at a first angle.

20 Claims, 8 Drawing Sheets

(56) References Cited

U.S. PATENT DOCUMENTS

| | | | |
|---|---|---|---|
| 4,347,742 A * | 9/1982 | Lohr, Jr. | ............... G01N 15/00 |
| | | | 73/866.4 |
| 4,743,143 A | 5/1988 | Nagasaka | |
| 5,753,806 A | 5/1998 | Ryan, III et al. | |
| 5,864,239 A | 1/1999 | Adams et al. | |
| 6,053,037 A | 4/2000 | Kojima et al. | |
| 6,298,719 B1 | 10/2001 | Schoeffel et al. | |
| 7,469,570 B2 | 12/2008 | Cooper | |
| 9,170,141 B2 | 10/2015 | Lee et al. | |
| 2007/0242871 A1 * | 10/2007 | Prociw | ................. G06T 7/0004 |
| | | | 382/141 |

FOREIGN PATENT DOCUMENTS

| | | | | |
|---|---|---|---|---|
| DE | 102013223443 A1 | 5/2015 | | |
| EP | 1063509 A2 | 12/2000 | | |
| EP | 1837829 A1 * | 9/2007 | ........... | G06T 7/0004 |
| EP | 1837829 A1 | 9/2007 | | |
| JP | 11352021 | 12/1999 | | |

OTHER PUBLICATIONS

Response to Extended Search Report from counterpart European Application No. 18152106.3, dated May 30, 2018, filed Jan. 9, 2019, 3 pp.

* cited by examiner

DIRECTED ENERGY DEPOSITION SPRAY NOZZLE DISTRIBUTION PATTERN TESTING

TECHNICAL FIELD

The present disclosure generally relates to systems and techniques for testing spray nozzle distribution patterns.

BACKGROUND

Additive manufacturing, for example, directed energy deposition techniques, may be used to fabricate a component having a predetermined three-dimensional structure, typically by depositing material layer-by-layer or volume-by-volume to form the structure, rather than by removing material from an existing component. Additive manufacturing may be advantageous in many situations, such as rapid prototyping, forming components with complex three-dimensional structures, or the like.

SUMMARY

In some examples, the disclosure describes an example system that includes a plurality of coaxial collection tubes extending substantially parallel to a major axis. Each tube of the plurality of coaxial collection tubes includes a first end defining an orifice, where the first end is disposed at a first position on a plane substantially orthogonal to the major axis; a second end coupled to an end of a respective outlet tube of a plurality of outlet tubes; and a collection tube wall extending from the first end to the second end, where the collection tube wall at the first end has a first diameter and the collection tube wall at a second position between the first end and the second end has a second diameter greater than the first diameter such that the collection tube wall extending from the second position to the first position tapers toward the major axis at a first angle.

In some examples, the disclosure describes an example technique of collecting particles from a stream of sprayed particles that includes positioning a spray nozzle over a collection apparatus at a first distance and collecting particles sprayed from the spray nozzle with the collection apparatus. The collection apparatus includes a plurality of coaxial collection tubes extending substantially parallel to a major axis. Each tube of the plurality of coaxial collection tubes includes a first end defining an orifice, where the first end is disposed at a first position on a plane substantially orthogonal to the major axis; a second end coupled to an end of a respective outlet tube of a plurality of outlet tubes; and a collection tube wall extending from the first end to the second end, where the collection tube wall at the first end has a first diameter and the collection tube wall at a second position between the first end and the second end has a second diameter greater than the first diameter such that the collection tube wall extending from the second position to the first position tapers toward the major axis at a first angle.

The details of one or more examples are set forth in the accompanying drawings and the description below. Other features, objects, and advantages will be apparent from the description and drawings, and from the claims.

DETAILED DESCRIPTION

Figure 1:
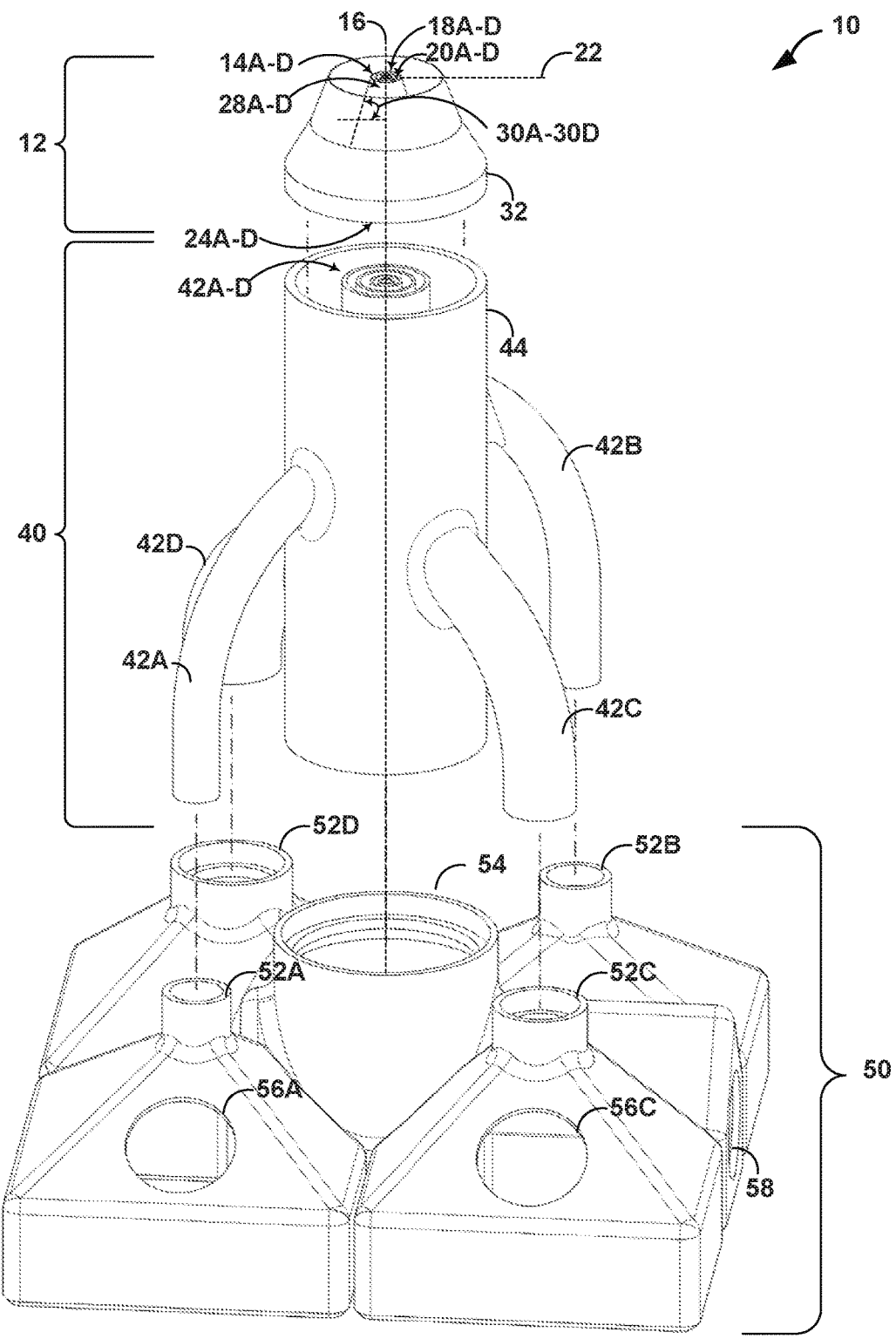
FIG. 1 is a conceptual and schematic partially exploded perspective view illustrating an example spray nozzle distribution pattern testing system.

The disclosure describes example systems and techniques for testing spray nozzle distribution patterns. Such systems and techniques may be used, for example, to test blown powder direct energy deposition ("DED") spray nozzle distribution patterns. DED systems typically deposit successive layers or volumes of material along a build direction based on a digital representation of a component. Example techniques for DED may include directing an energy beam at a region of a substrate of a component to form an advancing molten pool and delivering material from a spray nozzle to a target delivery region in or around the advancing molten pool, resulting in combining of the material and the substrate by sintering or melting, to form a deposited volume of a plurality of deposited volumes. The plurality of deposited volumes may define the component.

Blown powder DED may use material that includes powder of selected particle size and composition that is blown at or adjacent to the melt pool. During the deposition, the spatial distribution of the powder (referred to herein as the spray nozzle distribution pattern) may determine the actual delivery region in which powder is delivered. The spray nozzle distribution pattern may include, for example, powder size distribution as a function of position within the powder spray, powder weight or density as a function of position within the powder spray, gas flow rate as a function of position within the powder spray, and powder flow rate as a function of position within the powder spray. When the actual delivery region is not substantially similar to the target delivery region, i.e., in or around the advancing molten pool, deposition defects may occur. For example, powder may be left partially or fully unmelted, or otherwise unincorporated in the melt pool, or less powder than intended may be incorporated in the melt pool, leading to smaller than intended material addition. In either case, deviation from an expected amount of powder incorporation may lead to defects in the formed component, such as voids, inclusions, unwanted material phases or microstructures, poor cohesion, chambers that include residual, unjoined material, unintended vibration frequencies during operation of the component, blocked channels or openings, audible sound such as rustling or rattling during use, or the like.

In accordance with examples of this disclosure, an example system that includes multiple, concentric and coaxial collection tubes may be used to test spray nozzles to determine a spray nozzle distribution pattern. For example, the example system may include several coaxial collection tubes extending substantially parallel to a major axis, each coaxial collection tube including a first end and a second end. Each first end may define an orifice, and may be disposed at a first position on a common plane that is substantially orthogonal to the major axis. Each second end may be coupled to an end of a respective outlet tube of a plurality of outlet tubes. Each of the coaxial collection tubes may taper from a larger diameter to a smaller diameter near the first end.

In use of the system, a spray nozzle may be positioned to spray material into at least some of the orifices. The spray nozzle may be positioned at a selected distance from the common plane. The material that is blown into the coaxial collection tubes is routed into the respective outlet tubes. Each respective outlet tube may be fluidically connected to a respective receptacle. Material collected in each respective receptacle may be analyzed separately for weight distribution, particle size distribution, composition, or the like, allowing for direct measurement of spray nozzle distribution pattern as a function of radial position and spray nozzle distance from the common plane. For example, the systems and techniques described herein may allow measurement of particle size, material flow rate, material composition, and the like as a function of radial position and distance of the spray nozzle from the common plane. Thus, in accordance with examples of this disclosure, systems and techniques are provided to determine a spray nozzle distribution pattern by direct measurements of the material sprayed.

FIGS. 1-7 are conceptual and schematic diagrams illustrating different views of an example spray nozzle distribution pattern testing system 10 or sections thereof. In FIGS. 1-7, like reference numeral refer to like structures.

FIG. 1 is a conceptual and schematic partially exploded perspective view illustrating an example spray nozzle distribution pattern testing system 10. In some examples, spray nozzle distribution pattern testing system 10 may include collection tube section 12, outlet tube section 40, and receptacle section 50.

Collection tube section 12 may include a plurality of coaxial collection tubes 14A-14D (collectively, "coaxial collection tubes 14") each including a respective first end of first ends 18A-18D (collectively, "first ends 18 disposed on a common plane, and a respective second end of second ends 24A-24D (collectively, "second ends 24"). Collection tube section 12 also may optionally include a collection tube housing 32. During use of spray nozzle distribution pattern testing system 10, a spray nozzle 48 (FIG. 4) may be positioned a selected distance from orifices 20 to spray material into at least some of the orifices 20. In this way, collection tube section 12 may collect at least a portion of material sprayed from spray nozzle 48.

As each respective coaxial collection tube of coaxial collection tubes 14 is sized differently such that each has a different circumference and diameter at the common plane, orifices 20A-20D (collectively, "orifices 20") are defined by walls of coaxial collection tubes 14. Each orifice of orifices 20 provides an entry for material (e.g., blown powder) into spray nozzle distribution pattern testing system 10.

Outlet tube section 40 may include a plurality of outlet tubes 42A-42D (collectively, "outlet tubes 42") and optionally may include an outlet tube housing 44. A first end of each respective outlet tube of outlet tubes 42 may be coupled to a respective second end of second ends 24. Also, a first end of outlet tube housing 44 may be attached to an end of collection tube housing 32. During use of spray nozzle distribution pattern testing system 10, material that is blown into the coaxial collection tubes 14 may be routed into a respective outlet tubes of outlet tubes 42. For example, at the locations at which the respective outlet tubes 42 are attached to respective second ends 24. In this way, outlet tube section 40 may collect and route material corresponding to a radial and/or axial position of a spray nozzle distribution pattern.

Receptacle section 50 may include a plurality of receptacles 52A-52D (collectively, "receptacles 52") and a receptacle housing 54. Receptacles 52 each may include a respective gas outlet port of a plurality of gas outlet ports 56A-56D (collectively, "gas outlet ports 56"), and receptacle housing 54 may include an optional gas outlet port 58. Each respective receptacle of receptacles 52 may be fluidically coupled to a respective outlet tube of outlet tubes 42. Also, receptacle housing 54 may be fluidically coupled to outlet tube housing 44. During use of spray nozzle distribution pattern testing system 10, material that is routed into a respective outlet tube of outlet tubes 42 may be collected in a respective receptacle of receptacles 52 and gas may exit a respective receptacle of receptacles 52 via a respective gas outlet port 56. In this way, receptacle section 50 may collect material corresponding to a radial and/or axial position of a spray nozzle distribution pattern. In some examples, material received in an orifice between an outer collection tube 14D of collection tubes 14 and collection tube housing 32 may be collected in receptacle housing.

Material collected in each respective receptacle of receptacles 52 and receptacle housing 54 via spray nozzle distribution pattern testing system 10 may be separately analyzed to determine a weight distribution, a particle size distribution, composition distribution, or the like. For example, each receptacle of receptacles 52 may collect material or powder from a respective annular area corresponding to each of orifices 20. The weight distribution and/or particle size distribution may be used to determine a spray nozzle distribution pattern as a function of radial position, spray nozzle distance from the common plane, or any combination thereof. For example, spray nozzle distribution pattern testing system 10 may allow measurement of material size, material flow rate, material composition, and the like as a function of radial position and distance of spray nozzle 48 from the common plane. Thus, spray nozzle distribution pattern testing system 10 may be used to determine a spray nozzle distribution pattern by direct measurements of the material sprayed.

Each component (e.g., collection tube section 12, outlet tube section 40, and receptacle section 50) of spray nozzle distribution pattern testing system 10 may be formed from any suitable material. For example, spray nozzle distribution pattern testing system 10 may be formed from a plastic (e.g., acrylonitrile butadiene styrene, polylactic acid, polyethylene terephthalate, high-density polyethylene, polyvinyl chloride, polymethyl methacrylate, or the like), an electrically conductive plastic, a static dissipative plastic, a metal (e.g., aluminum, brass, bronze, copper, steel, or the like), an alloy, a combination of both a plastic and a metal, or the like. Collection tube section 12, outlet tube section 40, and receptacle section 50 may be formed of similar or different materials. For example, collection tube 12 may be formed from a metal, outlet tube section 40 may be formed from a plastic, and receptacle section 50 may be formed from a plastic. In some examples, any one or more of collection tube section 12, outlet tube section 40, receptacle section 50, or one or more of components thereof may be formed using directed energy deposition.

FIG. 2 is a conceptual and schematic cross sectional side view of an example collection tube section 12 of spray nozzle distribution pattern testing system 10. Collection tube section 12 may include coaxial collection tubes 14, which define respective major axes that may extend substantially parallel to a major axis 16 of spray nozzle distribution pattern testing system 10. In some examples, coaxial collection tubes 14 may be substantially conical in shape (e.g., a portion or all of a cone, such as a truncated cone, a cone terminating on one or both ends in a cylindrical shape, a truncated cone terminating on one or both ends in a cylindrical shape, or the like). In other examples, coaxial collection tubes 14 may be rectangular, pyramidal, or another shape. Coaxial collection tubes 14 may be configured to collect at least a portion of material (i.e., fluids and/or particles) sprayed from spray nozzle 48 at a specific radial and/or axial position relative to major axis 16.

Figure 3:
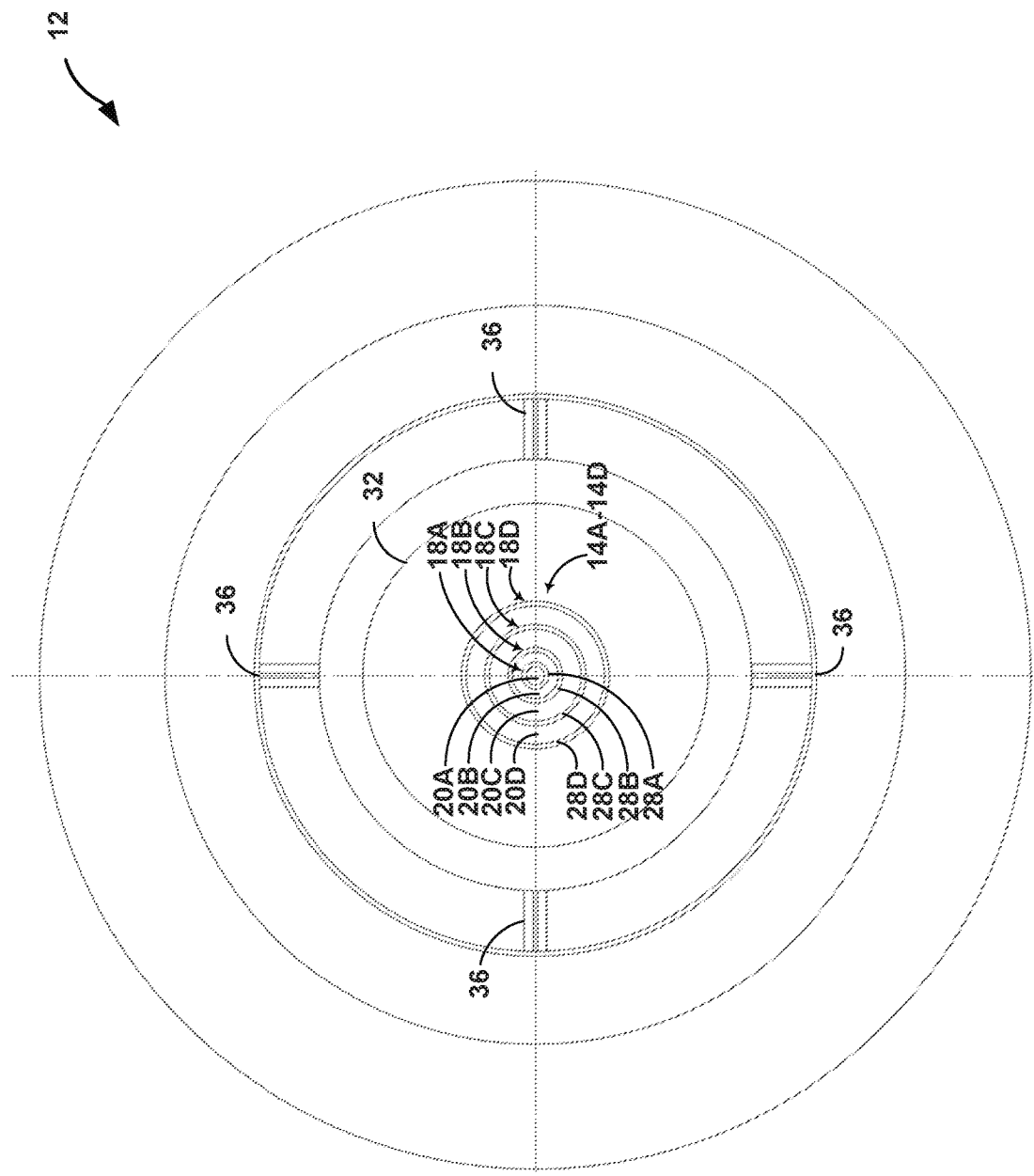
FIG. 3 is a conceptual and schematic plan view of an example collection tube section.

As best seen in FIG. 3, which is a conceptual and schematic plan view of collection tube section 12, each respective coaxial collection tube of coaxial collection tubes 14 may include a respective first end of first ends first ends 18 defining a respective orifice of orifices 20. As the collection tubes are coaxial, each respective coaxial collection tube of coaxial collection tubes 14 has a different diameter, and coaxial collection tubes that have smaller diameters are disposed within coaxial collection tubes that have larger diameters, such that, in descending diameter, coaxial collection tubes 14 are disposed radially inward from one another. For example, coaxial collection tube 14A may be disposed radially inward from coaxial collection tubes 14B, 14C, and 14D. The largest coaxial collection tube of coaxial collection tubes 14 is not disposed radially inward any of the other coaxial collection tubes 14. For example, coaxial collection tube 14D is not disposed radially inward from coaxial collection tubes 14A, 14B, and 14C.

As shown in FIG. 3, in some examples, each orifice of orifices 20 may include a circular area (e.g., orifice 20A) or an annular area (e.g. orifices 20B, 20C, 20D) defined by concentric coaxial collection tubes 14 or adjacent coaxial collection tubes 14. In this way, each orifice of orifices 20 may correspond to a spray nozzle material collection area.

In other examples, orifices 20 may be divided into smaller sections, such as two or more arcs or pie shapes. For example, each annular orifice (orifices 20B, 20C, and 20D) shown in FIG. 3 may be divided into two or more arcs, where each arc defines a respective orifice fluidically coupled to a respective collection tube. By dividing orifices 20 into multiple arc or pie shapes, the spray nozzle distribution pattern may be further divided so that the spray material distribution may be evaluate as a function of angle about major axis 16, in addition to as a function of radial distance from major axis 16. In this way, collection tube section 12 may be configured to collect at least a portion of material sprayed at a respective radial and, optionally, angular, position.

Figure 2:
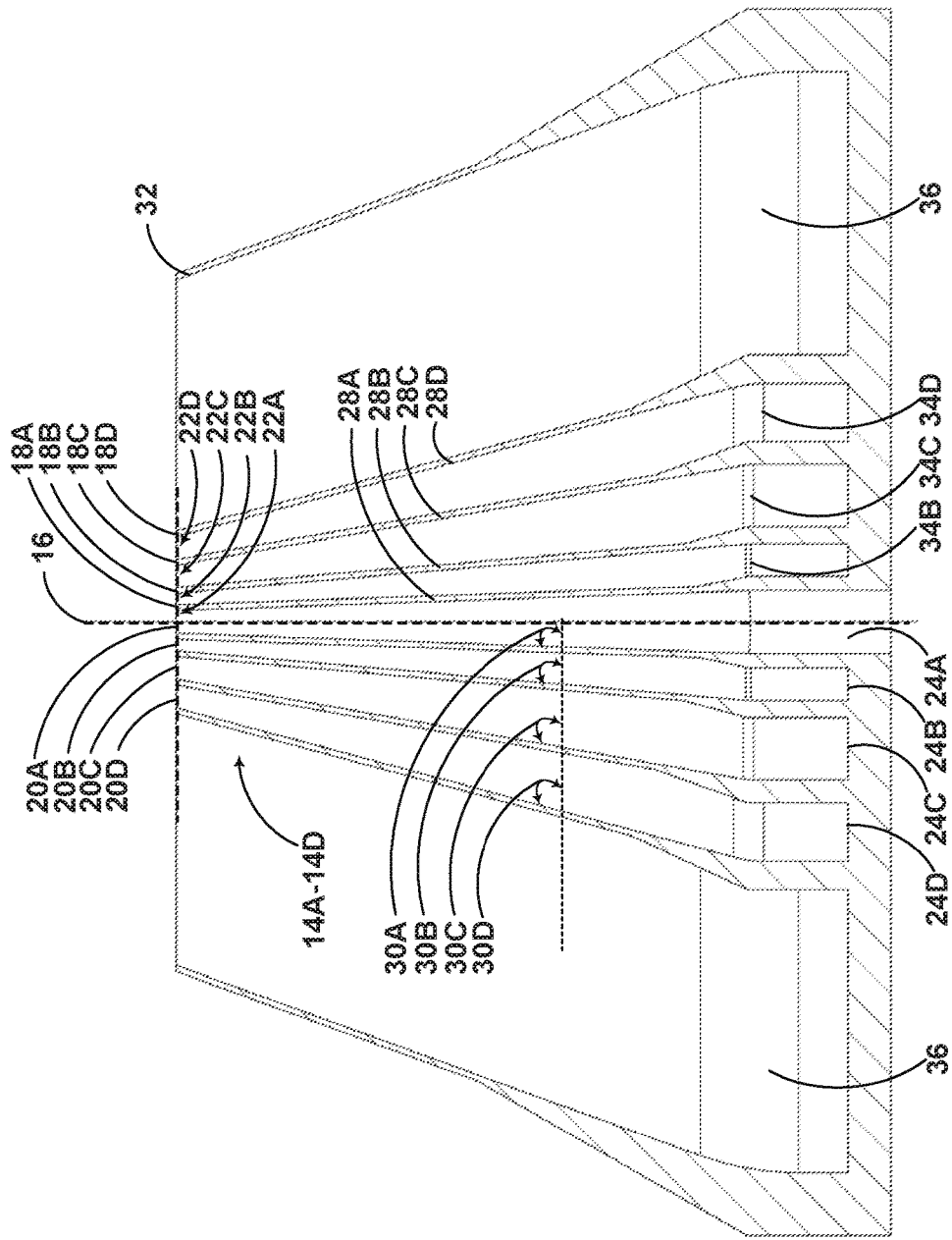
FIG. 2 is a conceptual and schematic cross sectional side view of an example collection tube section of an example spray nozzle distribution pattern testing system.

In some examples, as best seen in FIG. 2, each of first ends 18 of coaxial collection tubes 14 may be disposed at a respective first position of first positions 22A-22D (collectively, "first positions 22") substantially on a plane (on the plane or nearly on the plane) that is substantially orthogonal (orthogonal or nearly orthogonal) to major axis 16. For example, the first positions 22 may be on the plane within manufacturing tolerances of system 10. In some examples in which first ends 18 are disposed substantially on a common plane, a spray nozzle distribution pattern testing system 10 may be used to determine mass distribution, particle size distribution, composition distribution, or the like of spray nozzle 48 as a function of spray nozzle distance from the common plane. In other examples, first ends 18 may be disposed on different planes. For example, where a surface geometry of a melt pool of a DED process may be nonplanar (e.g., curved), first ends 18 may be disposed on different planes to resemble the surface geometry of the melt pool and to determine mass distribution, particle size distribution, composition distribution, or the like of spray nozzle 48 as a function of spray nozzle distance from the melt pool.

As best seen in FIG. 2, a respective collection tube wall of collection tube walls 28A-28D (collectively, "collection tube walls 28") may extend from a respective first end of first ends 18 to a respective second end of second ends 24. Collection tube walls 28 may define respective first diameters at first ends 18 and respective second diameters at second ends 24. In some examples, the respective first and second diameters of collection tube walls 28 may be selected to reduce collision of material sprayed from spray nozzle 48 with collection tube walls 28. For example, selection of a first diameter less than a second diameter may reduce collision of material sprayed from spray nozzle 48 with a generally diverging spray nozzle spray pattern (i.e., as viewed outward from spray nozzle 48). Hence, in some examples, for each coaxial collection tube of coaxial collection tubes 14, the respective first diameter may be less than the respective second diameter. As best seen in FIG. 2, in some examples, each respective collection tube wall of collection tube walls 28 extending in a direction from second ends 24 toward first ends 20 may taper toward major axis 16 at a respective angle of angles 30A-30D (collectively, "angles 30"), which may be between 0 and 90 degrees.

In other examples, for each coaxial collection tube of coaxial collection tubes 14, the respective first diameter may be substantially the same as the respective second diameter. In other words, collection tube walls 28 may not taper, i.e., tube walls 24 extending in a direction from second ends 24 toward first ends 20 may be substantially parallel to major axis 16 and angles 30 may be substantially equal to (e.g., equal to or nearly equal to) 90 degrees. In other examples, the first diameter may be greater than the second diameter. In other words, collection tube walls 28 extending in a direction from second ends 24 toward first ends 20 may taper away from major axis 16 and angles 30 may be greater than 90 degrees (e.g., between 90 and 180 degrees). Regardless of the particular values of angles 30, angles 30 may be the same or different. For instance, in the example shown in FIG. 2, angle 30D is greater than angle 30C, which is greater than angle 30B, which is greater than angle 30B.

In some examples, angles 30 may be selected based on an expected or predicted spray nozzle distribution pattern. For example, angles 30 may be selected to reduce collision of material sprayed from spray nozzle 48 with collection tube walls 28. As another example, angles 30 may reduce backpressure from a gas flow from spray nozzle 48 inside coaxial collection tubes 14. As another example, angles 30 may be substantially the same angle of the spray nozzle distribution pattern at a respective radial distance from major axis 16 to reduce friction between a material stream from spray nozzle 48 and collection tube walls 28, reduce a direction change of a material stream entering coaxial collection tubes 14, reduce a constriction of a material stream entering coaxial collection tubes 14, or the like. For example, spray nozzle 48 may output a relatively narrow spray nozzle distribution pattern, e.g., a spatial distribution of powder that diverges from a major axis normal to the spray nozzle tip at an angle less than about 15 degrees, such that angles 30 may be between about 98 degrees and about 80 degrees. As another example, spray nozzle 48 may output a wide spray nozzle distribution pattern, e.g., a spatial distribution of powder that diverges from the major axis at an angle greater than about 45 degrees, such that angles 30 may be between about 80 degrees and about 40 degrees. In some examples, angles 30 may be between about 97 degrees and about 75 degrees, or between about 92 degrees and about 50 degrees.

In some examples, as shown in FIG. 2, collection tube section 12 may include coaxial collection tube housing 32. In other examples, collection tube section 12 may not include coaxial collection tube housing 32. In some examples, coaxial collection tubes 14 may be disposed inside collection tube housing 32. In some examples collection tube housing 32 may be conical in shape. In other examples, collection tube housing 32 may be rectangular, pyramidal, or another shape. Collection tube housing 32 may be configured to collect material (i.e., fluids and/or particles) sprayed from spray nozzle 48 at a radial position outside of coaxial collection tubes 14, provide mechanical support for coaxial collection tubes 14, provide a connection point for collection tube section 12 to outlet tube section 40, or the like.

In some examples, as best seen in FIG. 2, collection tube section 12 may optionally include a plurality of coaxial collection tube supports 34B-34D (collectively, "coaxial collection tube supports 34"). Coaxial collection tube supports 34 may be disposed between adjacent coaxial collection tubes 14. In some examples, one or more coaxial collection tube supports 34 may be disposed between each pair of adjacent coaxial collection tubes 14. For example, four coaxial collection tube supports 34 may be disposed between each pair of adjacent coaxial collection tubes 14. In some examples, coaxial collection tube supports 34 may support one or more coaxial collection tubes 14. For example, coaxial collection tube supports 34 may support a respective coaxial collection tube of coaxial collection tubes 14 at a respective first position of first positions 22 (e.g., hold coaxial collection tubes 14 on a common plane). In some examples, coaxial collection tube supports 34 may maintain a spacing between adjacent coaxial collection tubes 14. For example, coaxial collection tube supports 34 may maintain a size and shape of a respective orifice of orifices 20 at a respective first position of first positions 22.

In some examples, as best seen in FIG. 2, collection tube section 12 may include collection tube housing supports 36. In some examples, collection tube housing supports 36 may support coaxial collection tubes 14 within coaxial collection tube housing 32. For example, collection tube housing supports 36 may support coaxial collection tubes 14 at first positions 22 (e.g., hold coaxial collection tubes 14 on a common plane). In some examples, collection tube housing supports 36 may maintain a spacing between collection tube housing 32 and an adjacent coaxial collection tube 14D. In some examples, one or more collection tube housing supports 36 may be disposed between collection tube housing 32 and an adjacent coaxial collection tube 14D. For example, four collection tube housing supports 36 may be disposed between collection tube housing 32 and adjacent coaxial collection tube 14D.

In some examples, one or both of coaxial collection tube supports 34 or collection tube housing supports 36 may be shaped to reduce collection of solid material (e.g., powder) on an outer surface of coaxial collection tube supports 34 or an outer surface of collection tube housing supports 36. For example, the outer circumferential surface (i.e., cross sectional shape) of coaxial collection tube supports 34 or collection tube housing supports 36 may be shaped as a rectangular prism, a teardrop, a triangular prism, or the like.

In some examples, coaxial collection tube supports 34 or collection tube housing supports 36 shaped as a teardrop or a triangular prism may be oriented such that a point or vertex of the teardrop or the triangular prism is disposed in a plane parallel to the major axis and where the point or vertex is oriented toward orifices 20 of the respective coaxial collection tubes 14. In examples in which spray nozzle distribution pattern testing system 10 includes tube supports 34 or collection tube housing supports 36 shaped as a teardrop or a triangular prism and oriented such that a point or vertex of the teardrop or the triangular prism is disposed in a plane parallel to the major axis where the point or vertex is oriented toward orifices 20 of the respective coaxial collection tubes 14, during use of spray nozzle distribution pattern testing system 10, material may be less likely to adhere to or otherwise collect on the outer surface of tube supports 34 or collection tube housing supports 36 oriented toward orifices 20 such that material collection on the outer surface of tube supports 34 or collection tube housing supports 36 may be reduced.

In some examples, coaxial collection tube supports 34 or collection tube housing supports 36 shaped as a rectangular prism may be oriented such that a first side that is substantially smaller than a second side disposed in a plane parallel to the major axis and where the first side is oriented toward orifices 20 of the respective coaxial collection tubes 14. In examples in which spray nozzle distribution pattern testing system 10 includes tube supports 34 or collection tube housing supports 36 shaped as rectangular prism and oriented such that the first side is oriented toward orifices 20 of the respective coaxial collection tubes 14, during use of spray nozzle distribution pattern testing system 10, material may be less likely to adhere to or otherwise collect on the outer surface of tube supports 34 or collection tube housing supports 36 oriented toward orifices 20 such that material collection on the outer surface of tube supports 34 or collection tube housing supports 36 may be reduced.

In this way, collection tube section 12 may collect at least a portion of material sprayed from spray nozzle 48 corresponding to a radial and/or axial position of a spray nozzle distribution pattern, while reducing material collection on collection tube walls 28 or coaxial collection tube supports 34.

Figure 4:
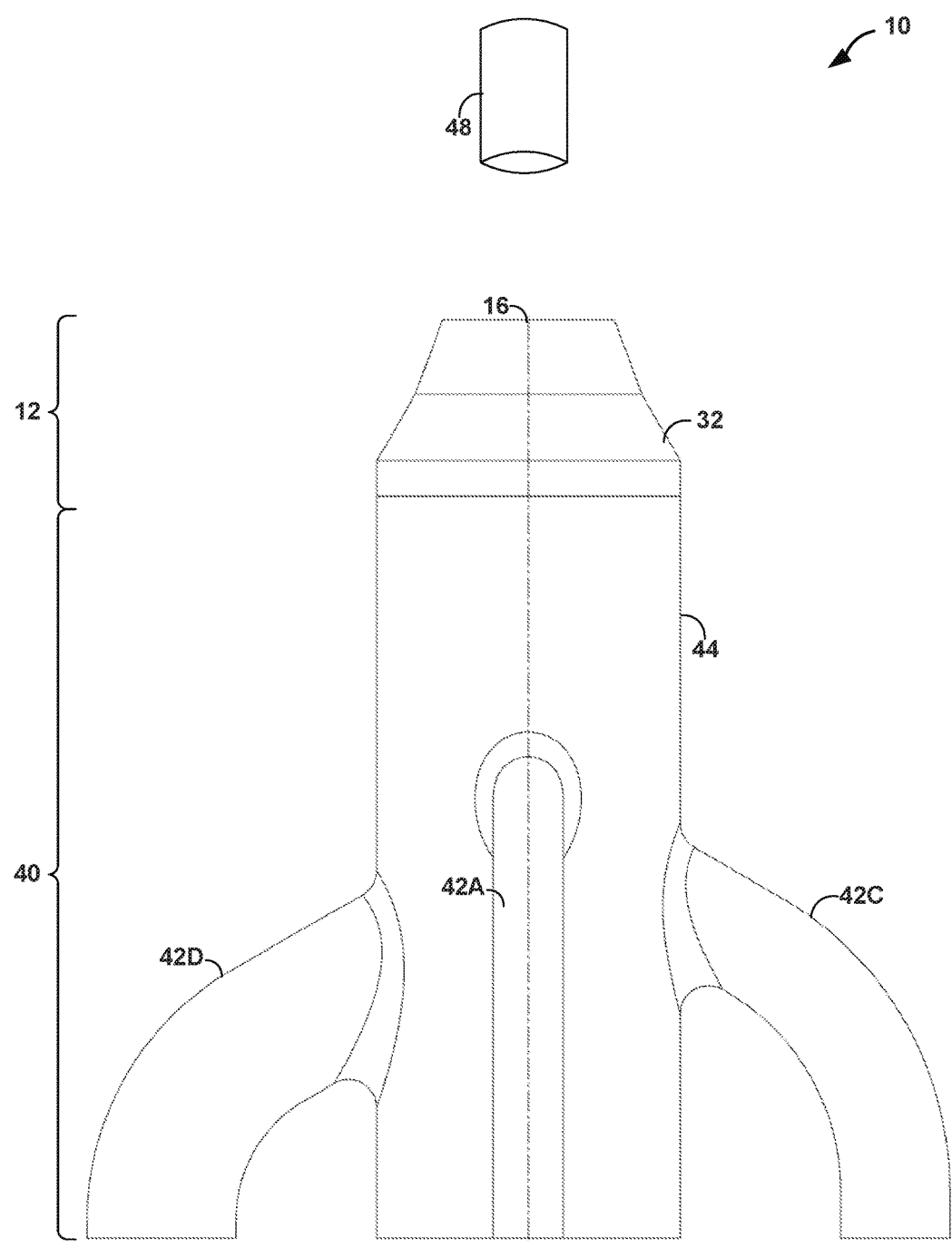
FIG. 4 is a conceptual and schematic side view of an example spray nozzle distribution pattern testing system.
Figure 6:
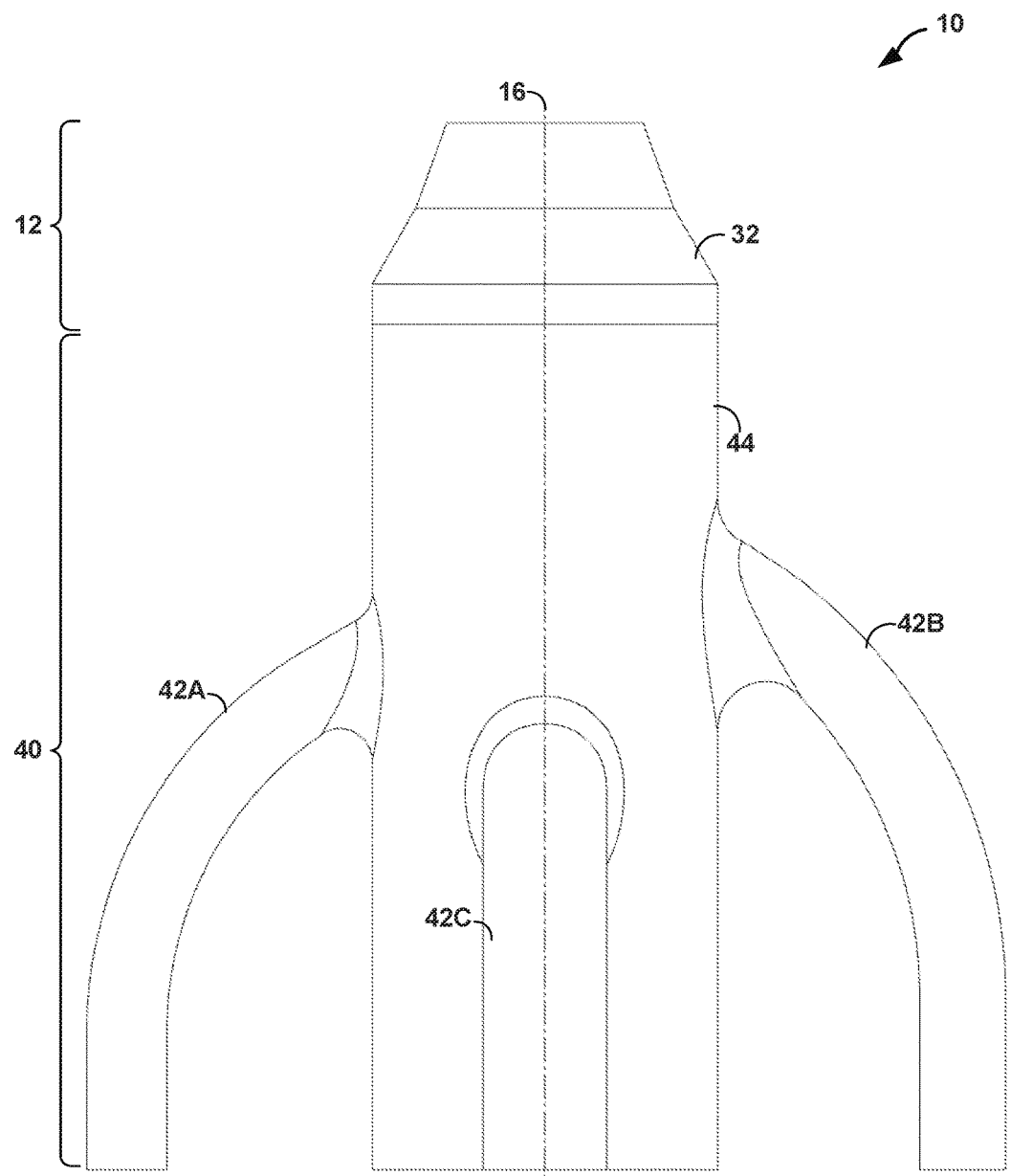
FIG. 6 is a conceptual and schematic side view of an example spray nozzle distribution pattern testing system.

FIGS. 4 and 6 are conceptual and schematic side views of spray nozzle distribution pattern testing system 10. (The view of FIG. 4, as compared to FIG. 6, is rotated approximately 90 degrees about major axis 16.) FIG. 4 also illustrates spray nozzle 48 positioned at a predetermined distance from coaxial collection section 12 of spray nozzle distribution pattern testing system 10. As shown in FIGS. 4 and 6, outlet tube section 40 may include outlet tubes 42 and outlet tube housing 44. In some examples, outlet tubes 42 may extend through at least a portion of outlet tube housing 44. In some examples, outlet tubes 42 may be positioned substantially equally about major axis 16. For example, spray nozzle distribution pattern testing system 10 includes four coaxial collection tubes 14 and four outlet tubes 42. Hence, outlet tubes 42 may be disposed with a spacing of about 90 degrees relative to adjacent outlet tubes 42 about major axis 16. For example, as shown in FIGS. 4 and 6, the portion of a respective outlet tube of outlet tubes 42 extending through outlet tube housing 44 may be disposed about 90 degrees relative to each adjacent outlet tube of outlet tubes 42.

Figure 5:
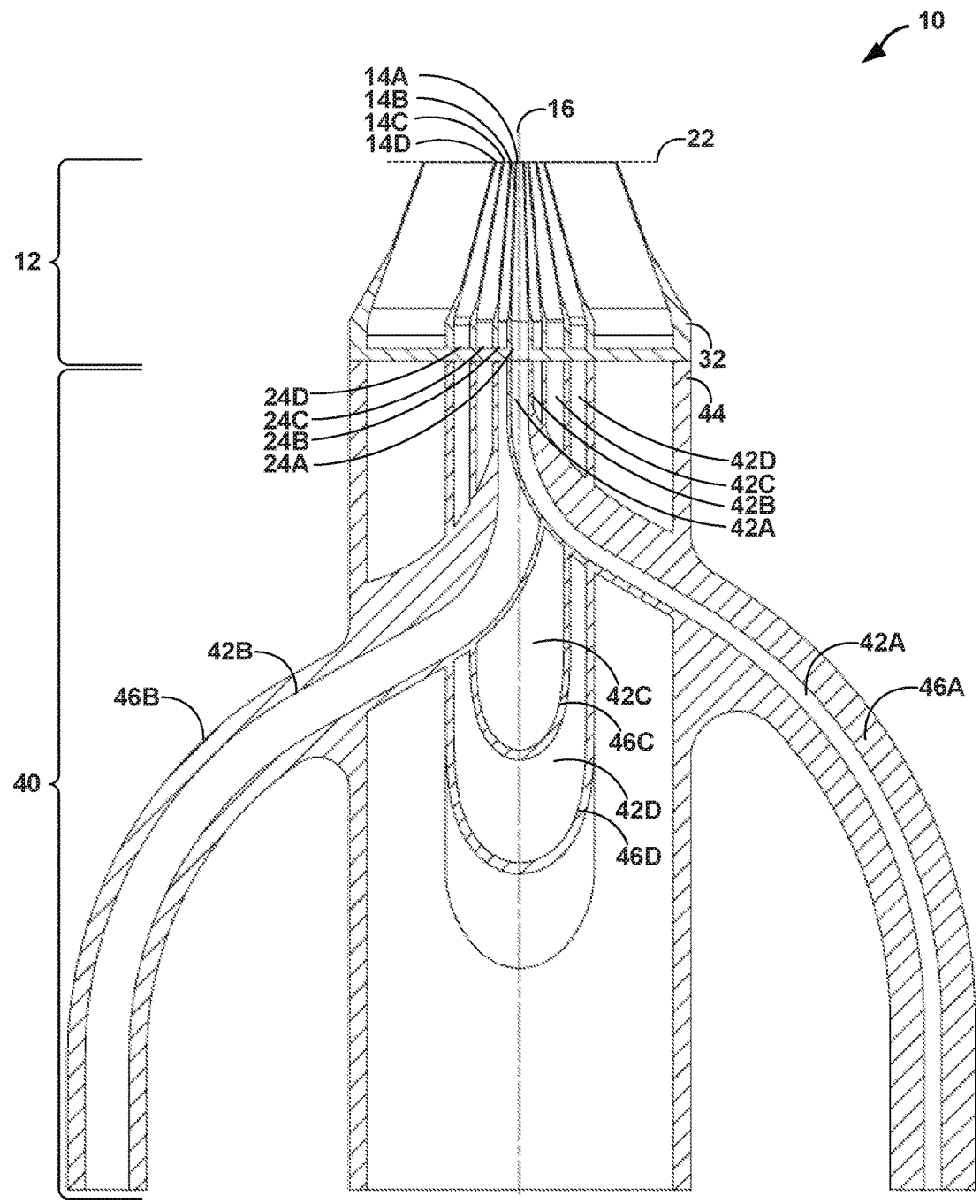
FIG. 5 is a conceptual and schematic cross-section of the side view of FIG. 4.
Figure 7:
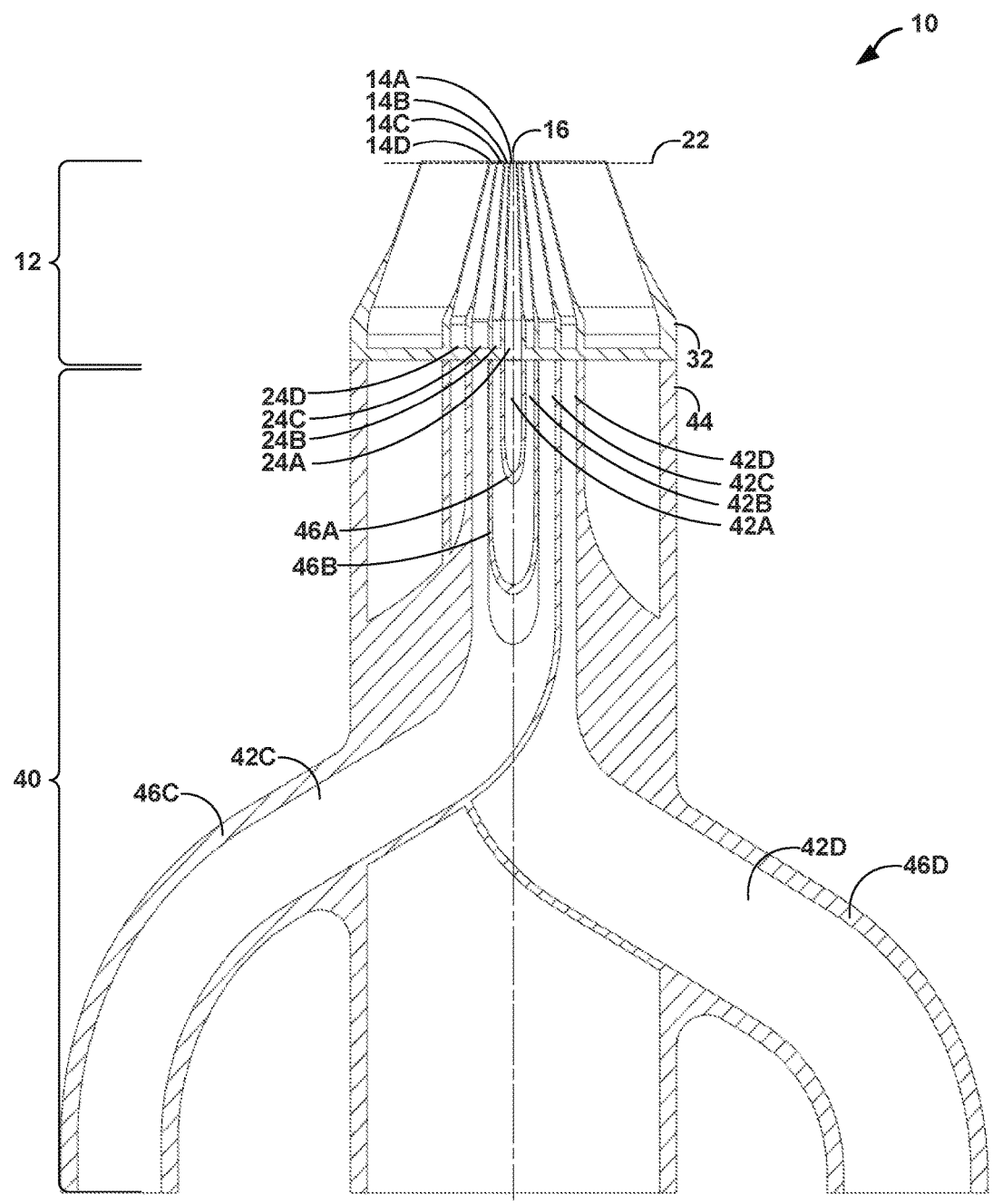
FIG. 7 is a conceptual and schematic cross-section of the side view of FIG. 6.

FIGS. 5 and 7 are conceptual and schematic cross-sections of the side views of FIGS. 4 and 6, respectively. In some examples, as best seen in FIGS. 5 and 7, a respective second end of second ends 24 of each respective coaxial collection tube may be coupled to a respective outlet tube of outlet tubes 42.

In some examples, each outlet tube of outlet tubes 42 may include a respective outlet tube wall of outlet tube walls 46A-46D (collectively, "outlet tube walls 46"). In some examples, a first outlet tube wall 46A of first outlet tube 42A coupled to a first coaxial collection tube 14A may extend through one or more outlet tube walls 46 having a larger diameter than the first outlet tube wall 46A. Similarly, as best seen in FIGS. 5, outlet tube wall 46B of outlet tube 42B coupled to coaxial collection tube 14B may extend through outlet tube walls 46C and 46D, and, as best seen in FIG. 6, outlet tube wall 46C of outlet tube 42C coupled to coaxial collection tube 14C may extend through outlet tube wall 46D. On the other hand, as best seen in FIG. 6, outlet tube wall 46D of outlet tube 42D fluidically coupled to coaxial collection tube 14D may not extend through any other outlet tube walls 46. In some examples, one or more of outlet tube walls 46 may extend through outlet tube housing 44. For example, as shown in FIGS. 5 and 6, each of outlet tubes walls 46 extends through outlet tube housing 44. In this way, each respective outlet tube of outlet tubes 42 may receive a respective portion of the sprayed material collected by a corresponding orifice of orifices 20 to which the respective cavity of the respective outlet tube is fluidically coupled.

In some examples, a shape of outlet tube walls 46 may be configured to reduce accumulation of material (e.g. powder) on the outer surface of outlet tube walls 46. For example, outlet tube walls 46 outer circumferential surface (i.e., cross sectional shape) may be shaped as a teardrop, a triangular prism, or the like. In some examples, outlet tube walls 46 shaped as a teardrop or a triangular prism may be oriented such that a point or vertex of the teardrop or the triangular prism is disposed in a plane parallel to the major axis and where the point or vertex is oriented toward orifices 20 of the respective coaxial collection tubes 14. In examples in which spray nozzle distribution pattern testing system 10 includes outlet tube walls 46 shaped as a teardrop or a triangular prism, oriented such that a point or vertex of the teardrop or the triangular prism is disposed in a plane parallel to the major axis and where the point or vertex is oriented toward orifices 20 of the respective coaxial collection tubes 14, during use of spray nozzle distribution pattern testing system 10, material may not substantially adhere to outer surfaces of outlet tube walls 46 oriented toward orifices 20 such that material collection on an outer surface of outlet tube walls 46 may be reduced.

In this way, each respective outlet tube of outlet tubes 42 may collect and route material corresponding to a radial and/or axial position of a spray nozzle distribution pattern, while reducing collection of material on outlet tube walls 46.

As shown in FIG. 1, a respective outlet tube of outlet tubes 42 may be coupled to a respective receptacle of 52. In other examples, outlet tubes 42 may not be coupled to receptacles 52. In some examples, outlet tube housing 44 may be fluidically coupled to receptacle housing 54. In some examples, receptacles 52 and/or receptacle housing 54 may be configured to collect solid particles. For example, receptacles 52 and/or receptacle housing 54 may include outlet ports 56 and outlet port 58, respectively. In some examples, outlet ports 56 and/or outlet port 58 may include a mesh screen, filter, or the like to allow gases to escape the respective receptacle while retaining solid particles inside the respective receptacle.

In this way, each respective receptacle of receptacles 52 may collect material corresponding to a radial and/or axial position of a spray nozzle distribution pattern, while reducing material loss through outlet ports 56 or outlet port 58.

Material collected in each respective receptacle of receptacles 52 and receptacle housing 54 may be separately analyzed to determine a weight distribution and/or a particle size distribution. The weight distribution and/or particle size distribution may be used to determine a spray nozzle distribution pattern as a function of radial position, axial position, distance of spray nozzle 48 from the common plane, or any combination thereof.

Figure 8:
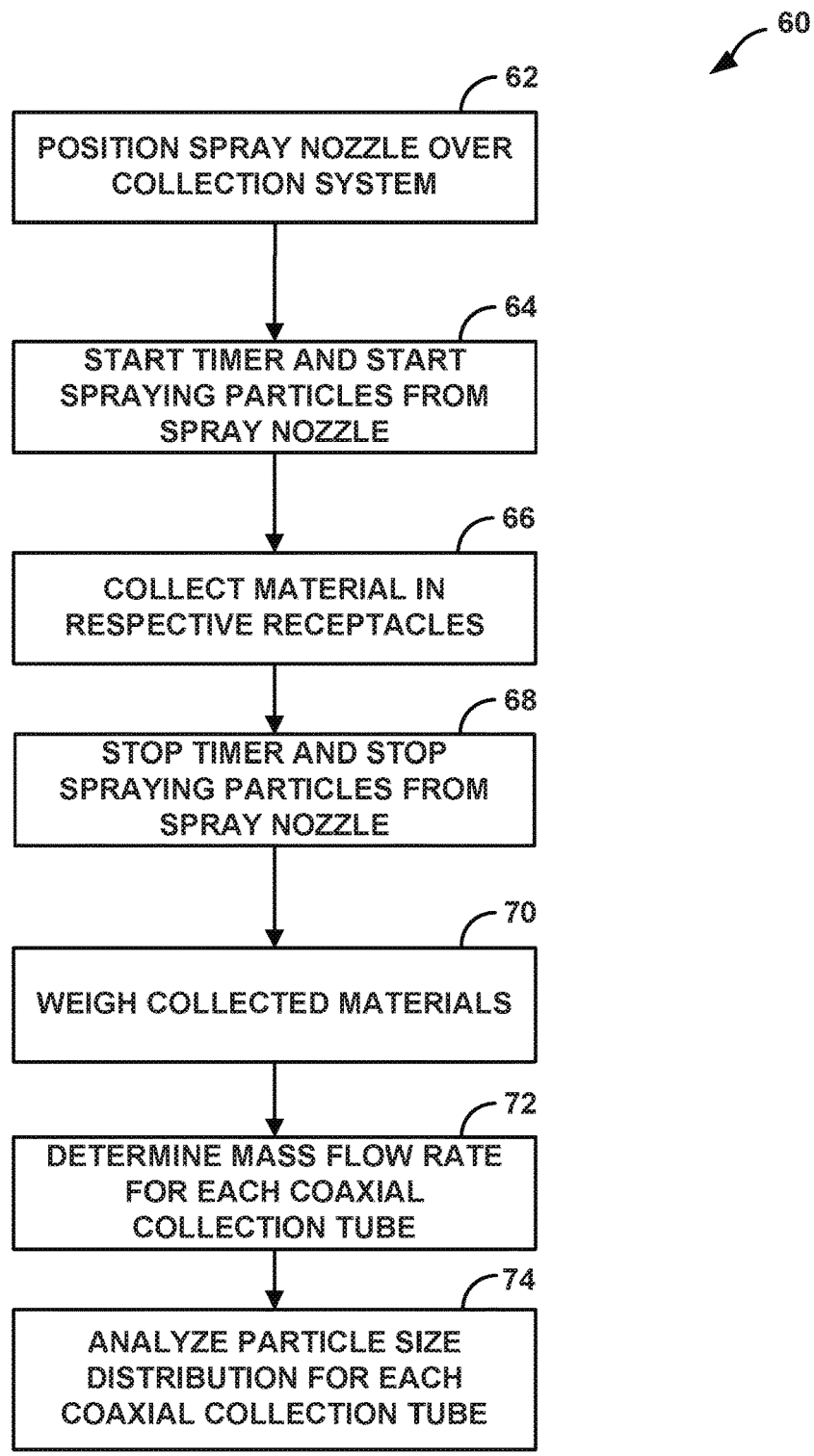
FIG. 8 is a flow diagram illustrating an example technique for spray nozzle distribution pattern testing.

FIG. 8 is a flow diagram 60 illustrating an example technique for spray nozzle distribution pattern testing. The technique of FIG. 8 may include positioning spray nozzle 48 to spray material into at least some of orifices 20 of spray nozzle distribution pattern testing system 10 (62). In some examples, spray nozzle 48 may be positioned at a selected distance from a common plane (e.g., first position 22) of spray nozzle distribution pattern testing system 10.

In some implementations, the spray nozzle distribution pattern may be a function of radial position, angular position, and axial distance from spray nozzle 48. For example, in implementations in which spray nozzle 48 produces a converging or diverging spray, the spray nozzle distribution pattern changes (e.g., expands or contracts) as a function of axial distance from spray nozzle 48. Hence, spray nozzle distribution pattern testing system 10 may be used to test a single spray nozzle 48 multiple times, each time at a different distance between the outlet of spray nozzle 48 and orifices 20 of spray nozzle distribution pattern testing system 10. This may allow determination of the spray nozzle distribution pattern in three dimensions, e.g., as a function of axial distance from spray nozzle 48, radial position, and, optionally, angular position about major axis 16.

Once spray nozzle 48 is positioned at the selected position, the spraying process may be started (64). In some examples, the duration of spraying may be timed with a timer, and the timer may be started at a selected time, e.g., when spraying is started or when receptacles 52 are coupled to outlet tubes 42. Measurement of the duration of spraying may allow to determining a mass flow rate of material as the quotient of mass collected over time.

During use of spray nozzle distribution pattern testing system 10, material (e.g., powder) may be blown into coaxial collection tubes 14, may be routed into respective outlet tubes 42, and may be collected in respective receptacles 52 (66). At a selected time, the spraying process and timer may be stopped (68). Material collected in each respective receptacle of receptacles 52 may be weighed, e.g., using a mass balance or a scale (70). The weight of material collected in each respective receptacle 52 may be used to determine a mass distribution of material. In some examples, a material mass flow rate for a respective radial distance of a respective coaxial collection tubes 14 may be determined from the weight of material in each respective receptacle of receptacles 52 and the duration of spraying (72).

In some examples, material collected in each respective receptacle of receptacles 52 may be analyzed to determine a particle size distribution for a respective radial distance of a respective coaxial collection tubes 14. For example, a particle size distribution for a respective radial distance of a respective coaxial collection tubes 14 may be determined by sieve analysis, air elutriation analysis, or the like. In other examples, a particle size distribution for a respective radial distance of a respective coaxial collection tubes 14 may be determined in situ, e.g., as particles travel through outlet tubes 42 or receptacles 52. For example, a particle size distribution for a respective radial distance of a respective coaxial collection tubes 14 may be determined by photo-analysis (e.g., optical granulometry), laser diffraction, or the like. In some examples, a weight distribution, particle size distribution, or combination thereof may be used to characterize a spray nozzle distribution pattern as a function of radial position and distance of a spray nozzle from the common plane.

Various examples have been described. These and other examples are within the scope of the following claims.

The invention claimed is:

1. An apparatus comprising:
a plurality of coaxial collection tubes extending substantially parallel to a major axis,
wherein each tube of the plurality of coaxial collection tubes comprises:
a first end defining an orifice, wherein the first end is disposed at a first position on a plane substantially orthogonal to the major axis,
a second end coupled to an end of a respective outlet tube of a plurality of outlet tubes, the respective outlet tube comprising an outlet tube wall, and
a collection tube wall extending from the first end to the second end, wherein the collection tube wall at the first end comprises a first diameter, wherein the collection tube wall at a second position between the first end and the second end comprises a second diameter greater than the first diameter, wherein the collection tube wall extending from the second position to the first position tapers toward the major axis at a first angle,
wherein a first coaxial collection tube of the plurality of coaxial collection tubes is disposed radially inward from a second coaxial collection tube of the plurality of coaxial collection tubes,
wherein a first outlet tube wall of the plurality of outlet tubes extends through a second outlet tube wall of the plurality of outlet tubes, and
wherein a shape of the first outlet tube wall is configured to reduce accumulation of particles on the outer surface of the first outlet tube wall.

2. The apparatus of claim 1, wherein the respective outlet tube of the plurality of outlet tubes is fluidically coupled to a respective receptacle of a plurality of receptacles.

3. That apparatus of claim 2, wherein each of the plurality of receptacles is configured to collect solid particles.

4. The apparatus of claim 1, wherein the first angle of each respective coaxial collection tube of the plurality of coaxial collection tubes is based on the second diameter and the first diameter and a spray cone or a spray pattern of a spray nozzle.

5. The apparatus of claim 1, wherein the first angle of each respective tube of the plurality of coaxial collection tubes reduces the collision of particles sprayed from a spray nozzle with the collection tube wall of each respective coaxial collection tube of the plurality of coaxial collection tubes.

6. The apparatus of claim 1, wherein the first angle of each respective coaxial collection tube of the plurality of coaxial collection tubes reduces gas flow back pressure in each respective coaxial collection tube of the plurality of coaxial collection tubes.

7. The apparatus of claim 1, wherein the first outlet tube wall is shaped as a teardrop or a triangular prism, wherein a point or vertex of the teardrop or the triangular prism is disposed in a plane parallel to the major axis, wherein the point or vertex is oriented toward the orifice of the respective coaxial collection tubes of the plurality of coaxial collection tubes.

8. The apparatus of claim 1, wherein the orifice comprises at least two divided sections.

9. The apparatus of claim 2, wherein the respective receptacle of the plurality of receptacles comprises a gas outlet port.

10. A method of collecting particles from a stream of sprayed particles, the method comprising:
positioning a spray nozzle over a collection apparatus at a first distance, wherein the collection apparatus comprises:
a plurality of coaxial collection tubes extending substantially parallel to a major axis, wherein each tube of the plurality of coaxial collection tubes comprises:
a first end defining an orifice, wherein the first end is disposed at a first position on a plane substantially orthogonal to the major axis,
a second end coupled to an end of a respective outlet tube of a plurality of outlet tubes, the respective outlet tube comprising an outlet tube wall,
a collection tube wall extending from the first end to the second end, wherein the collection tube wall at the first end comprises a first diameter, wherein the collection tube wall at a second position between the first end and the second end comprises a second diameter greater than the first diameter, wherein the collection tube wall extending from the second position to the first position tapers toward the major axis at a first angle,
wherein a first coaxial collection tube of the plurality of coaxial collection tubes is disposed radially inward from a second coaxial collection tube of the plurality of coaxial collection tubes,
wherein a first outlet tube wall of the plurality of outlet tubes extends through a second outlet tube wall of the plurality of outlet tubes, and
wherein a shape of the first outlet tube wall is configured to reduce accumulation of particles on the outer surface of the first outlet tube wall; and
collecting particles sprayed from the spray nozzle with the collection apparatus.

11. The method of claim 10, wherein the first distance is based on a spray pattern of the spray nozzle.

12. The method of claim 10, wherein the outer diameter of the spray pattern of the spray nozzle at the first distance is substantially equal to the outer diameter of at least one coaxial collection tube of the plurality of coaxial collection tubes.

13. The method of claim 10, further comprising:
weighing the particles collected from each tube of the plurality of coaxial collection tubes; and
determining a mass flow distribution of the spray nozzle based on the weight of particles collected from each tube of the plurality of coaxial collection tubes.

14. The method of claim 10, wherein the particles are solid particles.

15. The method of claim 14, further comprising: determining a solid particle size distribution of the solid particles collected from each tube of the plurality of coaxial collection tubes.

16. The method of claim 10, wherein the respective outlet tube of the plurality of outlet tubes is fluidically coupled to a respective receptacle of a plurality of receptacles.

17. The method of claim 10, wherein the first angle of each respective tube of the plurality of coaxial collection tubes is based on the second diameter and the first diameter and a spray pattern of a spray nozzle.

18. The method of claim 10, wherein the first angle of each respective tube of the plurality of coaxial collection tubes reduces collision of solid particles sprayed from a spray nozzle with the collection tube wall of each respective tube of the plurality of coaxial collection tubes or reduces gas flow back pressure in each respective tube of the plurality of coaxial collection tubes.

19. The method of claim 10, wherein the orifice comprises at least two divided sections.

20. The method of claim 16, wherein the respective receptacle of the plurality of receptacles comprises a gas outlet port.

* * * * *